Jan. 13, 1959 R. F. STEED 2,868,016
LIQUID LEVEL GAUGE
Filed Oct. 7, 1955
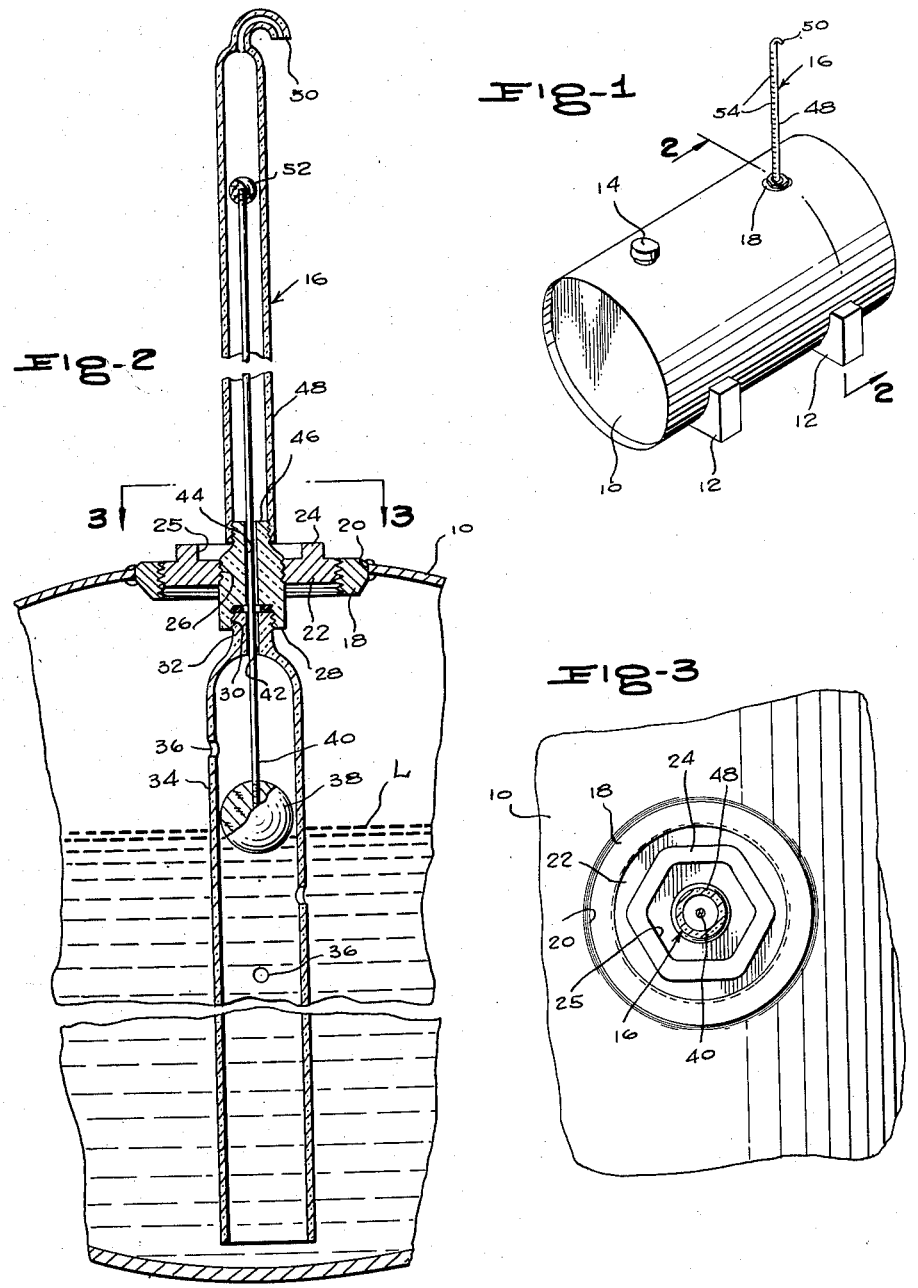
INVENTOR.
ROBERT F. STEED
BY
McMorrow, Berman & Davidson
ATTORNEYS

2,868,016

LIQUID LEVEL GAUGE

Robert F. Steed, Fuquay Springs, N. C.

Application October 7, 1955, Serial No. 539,045

2 Claims. (Cl. 73—322)

This invention, a liquid level gauge of the type indicating exteriorly of a tank the level of the liquid in the tank by rise and fall of a float, has among others the following important objects:

To include in the device a tank-venting as well as a level-indicating function;

To permit selective interchange of components of the gauge, so as to permit its use on tanks of different shapes, sizes, and diameters merely by change of one or more components while the rest remain usable in any installation regardless of tank size;

To effect attachment of the device to a tank with minimum difficulty; and

To simplify the construction to an extent such as will permit low cost manufacture and will yet assure to the maximum extent trouble-free, accurate operation.

Other objects will appear from the following description, the claims appended thereto, and from the annexed drawing, in which like reference characters designate like parts throughout the several views, and wherein:

Figure 1 is a perspective view of a tank equipped with a gauge formed according to the present invention;

Figure 2 is an enlarged section on line 2—2 of Figure 1; and

Figure 3 is a section on line 3—3 of Figure 2.

A conventional tank 10 is supported on a stand 12 and includes a conventional filler cap 14.

The device 16 constituting the invention is mounted vertically on the tank, part extending inside and part extending outside the same, in a mounting ring 18 welded at its outer periphery at 20 in a tank opening. The ring is internally threaded to engage a complementarily threaded plug 22 formed with an upstanding hexagonal or other wrench-receiving projection 24 having a large center recess 25.

A threaded center opening 26 in plug 22 is provided and extending through and engaged therewith is a threaded, glass connector member 28 having a cylindrical body depending within the tank and formed at its lower end with a downwardly opening, threaded recess 30 engaging a reduced, exteriorly threaded axial extension 32 formed on the dome-shaped, closed upper end of a glass guide tube 34 having longitudinally spaced vent ports 36.

Freely shiftable within the tube, which is open at its lower end for entry of the liquid L, is a spherical cork float 38 connected to the lower end of a light-weight rod 40 loosely slidable in the bore 42 of extension 32, and within a coaxial bore 44 of member 28.

Threaded onto an exteriorly disposed, threaded, reduced extension 46 of member 28 is the lower end of a sight tube 48 projecting upwardly from the tank. This may be of a length substantially equalling the tank diameter; alternatively, it might be shorter, in which event it would permit indication of a dropping of the liquid level to an extent warranting filling of the tank but would not indicate any further drops in the level.

At its upper end, the tube 48 is formed with a tubular extension 50 opening at its inner end within the tube and at its outer end to atmosphere. Extension 50 is of inverted J or U shape so that its outer end will open downwardly. This reduces the danger of dust filtering into the tank through the device and even more important, prevents rain from entering when the tank is in an exposed location. The elbow or extension 50 permits the escape of odors or fumes from the tank, the tubes 34, 48 serving as a conduit leading from within the tank to the elbow, and thus a desirable safety feature, that will amply vent the tank interior to atmosphere for dissipation of fumes if the liquid is explosive or flammable, is provided.

On the upper end of the rod 40, there is mounted a light-weight indicator element 52, adapted to register with the various indicia 54 of a liquid level scale calibrated on the sight tube.

In use, the float 38 will be buoyantly supported on the liquid L and will rise and fall with the level of the liquid. This will cause a corresponding movement of the indicator element 52 to provide an indication, exteriorly of the tank, of the level of the liquid therein.

The use of separable main components such as the float assembly (comprising rod 40 and element 52 and float 38 separable connected thereto); the tube 34; connector element 28; plug 22; and tube 48, permits use of certain of these components in practically all installations, with the other components being selected according to the particular situation. For example, a rod 40 of selected length can be used, with a sight tube 48 of a particular length, and bearing particular calibrations, on a tank of a certain shape and capacity. The guide tube 34, on the other hand, could be used in all tanks deep enough to receive it. Or, a longer connecting member 28 can be employed to extend the overall length of the device without requirement of changing the tubes. Then again, the connector element and plug might be interchanged with others to permit mounting of the illustrated tubes and rod in a tank having a gauge-receiving opening of a particular size. Reduction of manufacturing costs and simplicity of installation procedures are thus achieved without corresponding reduction of the number of different sizes and/or shapes of tanks in which the device can be mounted.

It is believed clear that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor changes in construction that may be permitted within the scope of the appended claims.

I claim:

1. A liquid level gauge for mounting in an opening of a tank, comprising a tubular connector member adapted for centering in the tank opening and formed with external threads substantially medially between opposite ends of the member; a flat, centrally apertured plug having external threads and formed with threads on the wall of the center aperture thereof, the last named threads engaging said connector member with the connector member extending through the aperture of the plug and projecting at its opposite ends upwardly and downwardly from the respective, opposite faces of the plug, said plug being formed with an upstanding projection extending about and spaced outwardly from said center opening and shaped for receiving a wrench, said projection having a large center recess communicating with the center aperture of the plug with the connector member at one end projecting upwardly within the recess, the connector member being formed at one end with an axial threaded recess communicating with the bore of the tubular member and at its other end with a reduced, exteriorly threaded axial extension through which the bore opens; a rod loosely slidable in said bore and projecting at its opposite ends beyond the opposite ends of the tubular member; a float on one end of the rod; an indicator element on the other end of the rod; a sight tube receiving said other end of the rod and internally threaded at one end for engagement on the reduced axial extension of the connector member; and a guide tube receiving the float-provided end of the rod and formed with a plurality of openings through which liquid may enter the guide tube, the guide tube being formed at one end with a reduced, exteriorly threaded axial extension engageable in said recess of the connector member, said extension of the guide tube being formed with an axial bore forming an extension of the bore of the connector member, the float being of substantially greater diameter than the bore of the extension of the guide tube, the indicator element being of greater diameter than the diameter of the bore of the connector member, whereby to hold the connector member, rod and guide tube against detachment from one another when the guide tube is threaded out of the recess of the connector member.

2. A liquid level gauge for mounting in a tank opening comprising: an elongated connector member adapted for being fixedly supported within said opening, said member having an axial bore of constant diameter from end to end of said member; a guide tube connected to one end of and depending from said member, said guide tube being aligned coaxially with said member and having an axial bore communicating with that of the connector member and formed to the same diameter as said bore of the connector member; a sight tube connected to the opposite end of said member and projecting upwardly therefrom in coaxial alignment with said member and with the guide tube; a rod straight from end to end thereof and formed to a diameter slightly less than the diameter of the bore of the connector member, said rod extending axially within the sight tube, connector member, and guide tube with its intermediate portion extending through the connector member and its opposite ends terminating one intermediate the ends of the sight tube and the other intermediate the ends of the guide tube, the difference in diameter between the rod and said bore of the connector member being of a value sufficient to permit free reciprocation of the rod within the bore of the connector member and the bore of the guide tube while substantially out of contact with the walls of said bores; a float secured to the end of the rod that is enclosed within the guide tube, said float being of a diameter slightly less than the inner diameter of the guide tube for free reciprocation of the rod within the guide tube substantially out of contact with the wall thereof; and an indicator element on the end of the rod disposed within the sight tube, said indicator element being of a diameter slightly less than the inner diameter of the sight tube for free reciprocation of the indicator element within the sight tube substantially out of contact with the wall thereof, the difference between the diameter of the float and the inner diameter of the guide tube, and the difference between the diameter of the indicator element and the inner diameter of the sight tube, being selected at a value such as to maintain the rod substantially in coaxial alignment with the bore of the connector member on engagement of the float and indicator element against the walls of the guide tube and sight tube respectively.

References Cited in the file of this patent

UNITED STATES PATENTS

| | | |
|---|---|---|
| 1,173,117 | Oberman | Feb. 22, 1916 |
| 1,429,832 | Bauer et al. | Sept. 19, 1922 |
| 1,444,922 | Jay | Feb. 13, 1923 |
| 1,518,838 | Davis | Dec. 9, 1924 |
| 1,679,451 | Van Duzer | Aug. 7, 1928 |
| 2,446,844 | Molavar | Aug. 10, 1948 |
| 2,565,423 | Evans | Aug. 21, 1951 |